United States Patent
Olivier

(10) Patent No.: US 6,882,694 B2
(45) Date of Patent: Apr. 19, 2005

(54) APPARATUS, AND ASSOCIATED METHOD, FOR ESTIMATING FREQUENCY OFFSET OF A DATA SYMBOL COMMUNICATED IN A COMMUNICATION SYSTEM

(75) Inventor: Jan C. Olivier, Irving, TX (US)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 10/335,200

(22) Filed: Dec. 31, 2002

(65) Prior Publication Data

US 2004/0203404 A1 Oct. 14, 2004

(51) Int. Cl.[7] .......................... H04L 25/08; H04L 27/22; H04Q 7/20; H04B 1/00
(52) U.S. Cl. ...................... 375/346; 375/326; 455/441; 455/70
(58) Field of Search ................... 455/441, 70; 375/326, 375/346

(56) References Cited

U.S. PATENT DOCUMENTS

| | | | |
|---|---|---|---|
| 5,884,178 A | * | 3/1999 | Ericsson et al. ............ 455/441 |
| 6,393,068 B1 | * | 5/2002 | Rupp ........................ 375/326 |
| 123,311 A1 | * | 9/2002 | Nagayasu ................... 455/70 |
| 6,628,926 B1 | * | 9/2003 | van de Beek et al. ........ 455/75 |
| 2002/0064210 A1 | * | 5/2002 | Sullivan .................... 375/145 |
| 2002/0123311 A1 | | 9/2002 | Nagayasu |

* cited by examiner

*Primary Examiner*—Amanda T. Le
*Assistant Examiner*—Cicely Ware

(57) ABSTRACT

Apparatus, and an associated method, for estimating frequency offset introduced upon symbols of a sequence communicated by a sending station to a data destination during operation of a communication system. A received sequence is rotated by multiplying the symbols thereof by offset values selected from a set of offset values. Then, for each rotated sequence, an estimation of a data sequence is made. Noise indicia associated with each estimated data sequence is calculated. And, comparisons are made of the noise indicia associated with each of the estimated data sequences. Responsive to the comparisons, selection is made of the frequency offset that has been introduced upon the data sequence.

16 Claims, 4 Drawing Sheets

APPARATUS, AND ASSOCIATED METHOD, FOR ESTIMATING FREQUENCY OFFSET OF A DATA SYMBOL COMMUNICATED IN A COMMUNICATION SYSTEM

The present invention relates generally to a manner by which to communicate data in a mobile, or other, communication system to a receiving station in which the data, when delivered to a data destination at the receiving station, exhibits frequency offset, caused, e.g., by Doppler shifting. More particularly, the present invention relates to apparatus, and an associated method, for estimating the frequency offset through the use of a linear technique.

Frequency offset estimation is performed accurately, irrespective of the magnitude of the frequency offset. The projection technique is a linear technique, permitting calculation of the frequency offset estimation to be performed at acceptable levels of computational complexity. And, as the estimation is based upon all received data, i.e., both pilot and data symbols, increasing the number of pilot symbols is not required to permit the frequency offset to be estimated.

BACKGROUND OF THE INVENTION

A communication system is utilized to communicate data between a sending station and a receiving station. Data that is to be communicated is sourced at the sending station and then communicated upon a communication channel to the receiving station at which the data is terminated.

The data is sometimes modulated, or otherwise altered, to place the data in a form to permit its communication upon the communication channel. And, once received at the receiving station, the data is demodulated, or otherwise operated upon, if necessary, to recover the informational content of the data.

As technological advancements have permitted, different types of communication systems have been developed. Many different types of communication systems are regularly utilized to effectuate the communication of data to perform many varied types of communication services. New types of communication systems, as well as improvements to existing communication systems, shall likely continue to be developed and implemented.

An exemplary type of communication system is a radio communication system. In a radio communication system, the communication channel upon which data is communicated between the sending and receiving stations is formed upon a radio link. A radio link is a designated portion of the electromagnetic spectrum, sometimes defined in terms of the frequency at which the radio link is defined. A fixed, wireline connection is obviated for the portion of the communication path extending between a sending and a receiving station that utilizes, instead, radio channels. Radio communication systems, as a result, are sometimes less expensive to install, relative to wireline counterparts, as a result of reduced infrastructure costs. And, a radio communication system is amenable for implementation as a mobile communication system in which communication mobility is permitted.

The allocation amount of the electromagnetic spectrum available upon which to define radio links at which to form communication channels is generally limited. Radio communication systems are, therefore, regularly referred to as being bandwidth-constrained systems. Sometimes, only by more efficiently utilizing the allocated spectrum can the communication capacity of the communication system be increased.

Use of digital communication techniques, for instance, provide for the possibility to increase the communication capacity of a communication system. Many digital communication techniques format digitized data into packets or frames and communicate the packets or frames upon shared communication channels, permitting packet-switched communications to be utilized.

Communication services that are, or are planned to be, effectuated are increasingly data-intensive. Large amounts of data must be communicated between sending and receiving stations in timely, and accurate, manner, properly to complete the communication service.

Realizable communication systems are nonideal. That is, the data that is communicated during operation of the communication system is distorted in some manner during its communication between its source at a sending station and its destination at a receiving station. For instance, in many, if not all, nonideal mobile radio communication systems, frequency offsets are introduced upon data symbols forming the data as the data is communicated between sending and receiving stations. The frequency offsets are caused by Doppler shifting when at least one of the sending and receiving stations is moving at a velocity during communication of the data. As the relative velocity increases, the frequency offsets caused by the Doppler shifting generally increase.

The frequency offset causes rotation of the received data symbols, when detected at a receiving station. That is to say, a data symbol is defined, in part, by a frequency component. And, the frequency offset caused by the Doppler shifting rotate, that is, alter, the frequency component of the data symbol. The offset must be estimated, and thereafter compensated for, to permit the actual values of the symbols properly to be recovered.

Additional frequency offset is introduced at the receiving station that receives the data. Frequency offset is introduced here, for instance, as a result of electrical circuitry imperfections. Frequency offset is introduced at the receiving stations of both mobile communication systems as well as other fixed-site receiving stations. Again, the frequency offset must be estimated, and thereafter compensated for, to permit the actual values of the symbols to be recovered properly.

In one manner by which to estimate the offset, pilot symbol assistance is utilized. Pilot symbols are contained in a data burst and are used to make a maximum likelihood (ML) estimation. In order for the estimation to be accurate, generally, a large number of pilot symbols are required to be contained in the burst. This need is especially evident if the carrier frequency is random as in a frequency hop environment or when the velocity at which a communication station is moving varies. In such a situation, the estimate can not be averaged over multiple bursts. The need to utilize a large number of pilot symbols reduces the number of symbols that can form data symbols in the bursts. And, thereby, the communication capacity of the communication system is limited by the need to utilize the large number of pilot symbols.

Sometimes, the maximum likelihood estimation that utilizes pilot symbols is supplemented by decision-directed symbols, based upon data symbol detection. However, this method works poorly, or fails, if the magnitude of the frequency offset is too large to permit the detection to yield accurate estimation of the data symbols. This type of estimation technique, therefore, is of limited utility when communication conditions induce large amounts of frequency offset.

In another manner by which to estimate the offset, estimation does not detect data symbols but instead utilizes the data symbols blindly. Methods that utilize this type of estimation usually are computationally complex. And, the computational capability of some communication stations is limited. This manner of estimation is, therefore, unavailable, or impractical, in systems in which computational capacity is limited.

As these existing manners by which to estimate the frequency offset suffer from various disadvantages, an improved manner by which to estimate frequency estimates would permit improved estimations to be performed, thereby improving the quality of communications in the communication system.

It is in light of this background information related to manners by which to estimate frequency offset in a communication system that the significant improvements of the present invention have evolved.

SUMMARY OF THE INVENTION

The present invention, accordingly, advantageously provides apparatus, and an associated method, by which to communicate data in a mobile, or other, communication system to a receiving station in which the data, when delivered to a destination at the receiving station, exhibits frequency offset.

Through operation of an embodiment of the present invention, a manner is provided for estimating the frequency offset through the use of a linear technique.

Accurate frequency-offset estimation is performed. The performance of the estimation is made accurately, irrespective of the magnitude of the offset frequency. The calculation of the frequency-offset estimation is performed at acceptable levels of computational complexity as the projection technique is linear. And, all of the received data is utilized in the estimation of the frequency offset. That is, both pilot symbols and data symbols are utilized in the estimation. Use of increased numbers of pilot symbols is not required in order to form the estimate.

In one aspect of the present invention, a blind frequency offset estimation technique is provided. Use of the technique produces an estimate of the frequency offset. A projection step is performed in a subspace spanned by a channel impulse response matrix. The technique is insensitive to the size of the frequency offset. Also, the technique need not be aided by the use of pilot symbols, and the throughput rate of the data is therefore not limited by the need otherwise to utilize increased numbers of pilot symbols. Further, the estimation technique operates on a per burst basis, and the use of long term averaging of values is not essential for performance of the frequency offset estimation.

In one aspect of the present invention, a signal formed of one or more data bursts is received at a receiving station forming part of a radio communication system. Each data burst is formed of a sequence of data symbols. And, each data burst is down-converted in frequency to be of a baseband level. Once converted to be of the baseband level, the data symbols of at least a selected data burst are multiplied by a phase rotation term.

The phase rotation term is selected from a set of pre-chosen values. And, more particularly, the phase rotation term is selected from a set of pre-chosen values of the offset. The pre-chosen values are, e.g., selected to correspond with values within an expected range of potential amounts of frequency offset. A rotated data burst is thereby formed through the multiplication of the phase rotation term together with the symbols of the data burst. Separate rotated data bursts, each multiplied by a separate phase rotation term of the set of pre-chosen values are formed. For instance, a plurality of rotated data bursts are formed, corresponding in number to the number of phase rotation terms of the set of pre-chosen values in which each rotated data burst is formed utilizing a separate one of the pre-chosen values.

In another aspect of the present invention, estimation operations are performed upon each of the rotated data bursts. The estimation operations function to estimate the values of the symbols-of the data bursts, once multiplied by the phase rotation terms, respectively, of the data bursts, prior to their communication upon the communication channel to the receiving station. That is to say, the estimation operations estimate values of the symbols of the data bursts as transmitted by a sending station to the receiving station, that is, without frequency offset and introduced upon such symbols, such as caused by Doppler shifting during their transmission upon the communication channel.

The estimation operations are performed utilizing indicia associated with a channel impulse response (CIR) of the communication channel upon which the data bursts are communicated. And, more particularly, a matrix H is used to represent the channel impulse response of the communication channel. The matrix H is set forth in Toeplitz form. The rotated data bursts, forming vectors, are each projected upon a subspace defined by the matrix H, set forth in Toeplitz form. Such projection is a linear operation. And the computational complexity required to perform such a linear operation is small enough to permit its operation in common processing devices in efficient manner. Estimated data vectors are formed for each of the rotated data bursts through such projection of the rotated data bursts upon the matrix representative of the channel impulse response.

In another aspect of the present invention, further operations are performed to obtain additional indicia associated with each of the estimated data vectors formed for each of the rotated data bursts. Namely, determinations are made of a noise sequence n associated with each of the estimated data vectors. The energy of such noise sequences are greater than a level $n_s$ unless the amount of phase rotation introduced upon the data burst associated with the noise sequence is of a certain amount, or a multiple of the certain amount. In particular, when the phase rotation multiplied upon the symbols of a data burst correspond to an integer multiple of a smallest modulation constellation increment of the constellation set used in the communication system, the noise sequence is of a level less than the level $n_s$. The standard deviation of the energy level of the noise sequence is also determined. For each estimated data vector, a noise sequence and its standard deviation are calculated.

The standard deviations of each of the noise vectors are compared. As the noise sequences associated with different ones of the estimated data sequences are of different values, the corresponding standard deviations of the noise sequences also are of differing values. The estimated data sequence associated with the standard deviation of the smallest value is selected to exhibit the phase rotation corresponding to the frequency offset introduced upon the data burst during its transmission to the data destination associated with the receiving station. Such selection is made as the amount of phase rotation introduced upon, that is, multiplied together with, the symbols of the data vector most closely corresponds to the amount of frequency offset and Doppler shifting introduced upon the data burst during its transmission upon the communication channel to the receiving station.

The multiplication operations performed upon a received data burst, projection of vectors upon the matrix representation of the channel impulse response, calculation of noise sequences and their standard deviations, and comparison operations are all linear operations. Computations that are required to be carried out by the receiving station are readily implementable as the computational complexity of the required operations is relatively straightforward, requiring only linear operations to be performed. Additionally, the operations do not require the use of increased numbers of pilot symbols to form parts of the data bursts. Throughput rates are, accordingly, not reduced by the need otherwise to increase the number of pilot symbols in the data bursts.

In one implementation, a manner is provided for estimating the frequency offset introduced upon data symbols sent during operation of a cellular communication system, such as a cellular communication system constructed generally pursuant to the operating specification that defines operation of a GSM/GPRS (Global System for Mobile communications/General Packet Radio Service) system. Frequency offset, such as caused by Doppler shifting and electrical circuitry imperfections, introduced upon data communicated upon a forward link channel to a mobile station, is estimated. And frequency offset introduced upon data communicated upon a reverse link channel to the network part of the communication system is also estimated. When received at the appropriate receiving station, i.e., a mobile station or base transceiver station, the data is converted into baseband form. The data sequence is multiplied by phase rotation terms selected from a set of pre-chosen values. A separate, rotated sequence is formed for each of the pre-chosen values of the phase rotation terms. An estimated data sequence is formed for each of the rotated sequences by projecting the rotated sequence onto a matrix representative of the channel impulse response of the channel upon which the data is communicated. Noise sequences and their associated standard deviations are determined for each of the estimated data sequences. The standard deviations are compared. And, the frequency offset associated with the estimated data sequence that exhibits the smallest standard deviation of its noise sequence is selected to be the frequency offset that is introduced unpon the data during its transmission.

In these and other aspects, therefore, apparatus, and an associated method is provided for a communication system in which a data sequence, formed of initial data symbol values, is communicated upon a communication channel to a receiving station. An estimate of the frequency offset of the received data symbols is formed responsive to received data symbol values. A first-stage data-value determiner is coupled to receive indications of the data symbol values received at the receiving station. The first-stage data-value determiner determines a first, first-stage estimate of the data sequence and at least a second, first-stage estimate of the data sequence. A noise indicia calculator is coupled to the first-stage data-value determiner. The noise indicia calculator calculates a noise indicia associated with each of the first-stage estimates. A selector is coupled to receive values of the noise indicia. The selector selects a selected one of first and at least second first-stage estimates, respectively, to be the frequency offset of the received data symbols.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
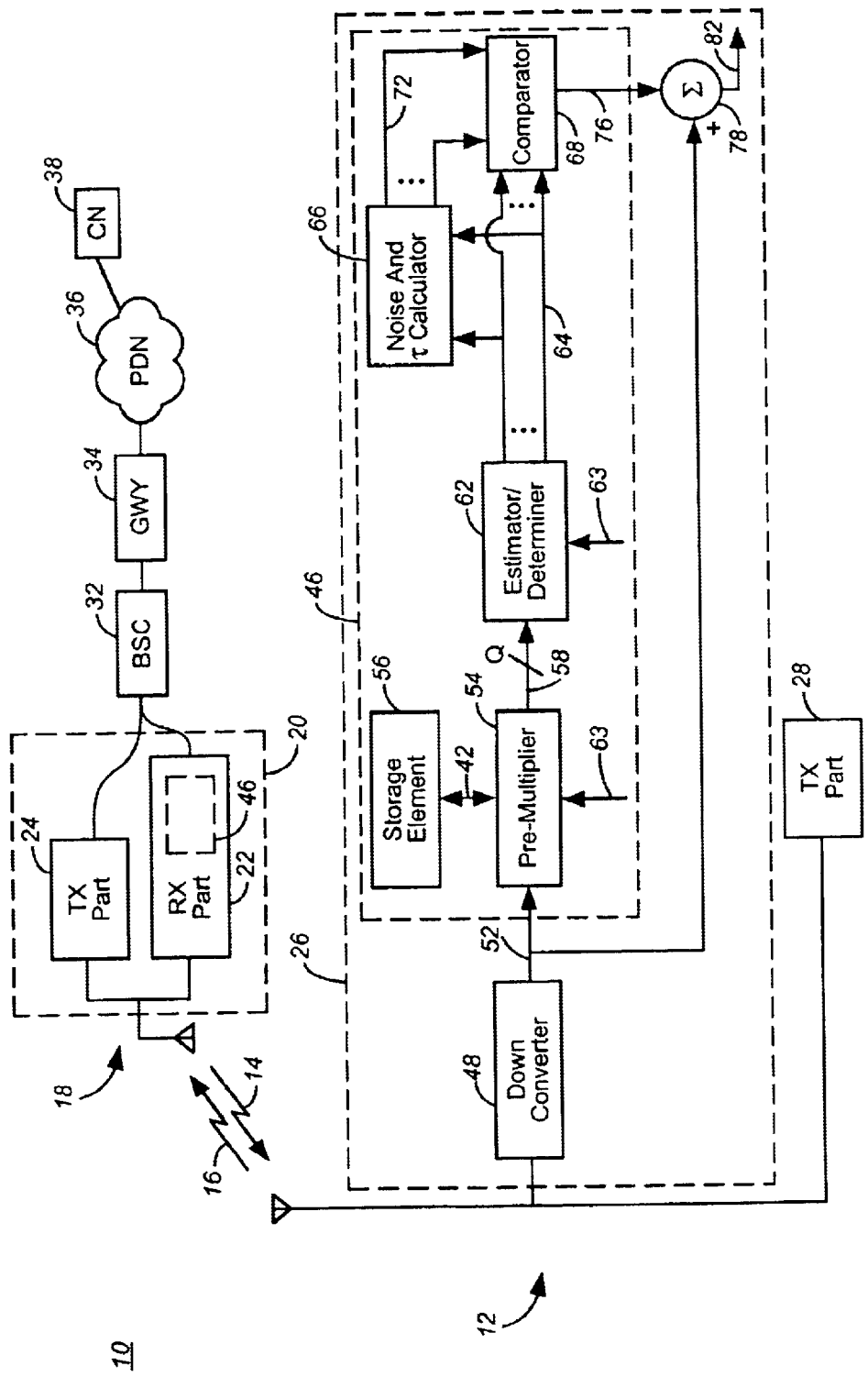
FIG. 1 illustrates a functional block diagram of a radio communication system in which an embodiment of the present invention forms a portion.

Referring first to FIG. 1, a radio communication system, shown generally at 10, provides for radio communications with a mobile station 12 in which, here, two-way communication of data is effectuated. The following description shall describe operation of an exemplary implementation of the present invention in which the communication system forms a cellular communication system.

The cellular communication system is operable pursuant to any selected digital cellular standard. For instance, the communication system 10 is representative of a GSM (General System for Mobile Communications) system, such as a GSM system that provides for GPRS (General Packet Radio Service) or EDGE (Enhanced Data for GSM Evolution). Each of such systems provides for data communications. The communication system is also representative of other types of cellular communication systems, such as a system operable pursuant to a CDMA 2000 (Code-Division, Multiple-Access 2000) communication scheme. And, more generally, the communication system 10 is representative of many of various mobile communication systems in which data is communicated upon communication channels in which the data is susceptible to frequency offset such as frequency offset caused by Doppler shifting and electronic-circuitry imperfections.

The following description shall describe operation of an embodiment of the present invention with respect to its implementation in a cellular communication system that provides for data communications. However, it should be understood that the present invention is analogously also operable in other types of mobile, and other, communication systems and that description of operation of the present invention can analogously be described with respect to its implementation in such other types of communication systems.

The mobile station 12 communicates by way of radio links with a network part of the communication system. The radio links are represented here by a forward link 14 and a reverse link 16. Two-way communications are effectuated with the mobile station by way of data communicated upon channels defined upon the forward and reverse links.

The network part 18 of the communication system includes a base station system (BSS) that includes a base transceiver station (BTS) 20. The base transceiver station of the base station system forms a radio transceiver and includes a receive part 22 and a transmit part 24. And, the circuitry of the mobile station also forms a radio transceiver and includes a receive part 26 and a transmit part 28.

The transmit part 24 of the base transceiver station operates to generate signals that are communicated upon forward link channels defined upon the forward link 14 for delivery to the mobile station. And, the receive part 26 of the mobile station operates to receive, and to act upon, the signals communicated thereto. Analogously, the transmit part 28 of the mobile station operates to generate signals that are communicated upon reverse link channels defined upon the reverse link 16 for delivery to the base transceiver station. And, the receive part 22 of the base transceiver station operates to receive, and to act upon, the signals communicated thereto.

The base transceiver station is coupled to a base station controller (BSC) 32 that, together with the base transceiver, forms a portion of the base station system. The base station controller operates, amongst other things, to control operation of the base transceiver station. The base station controller is, in turn, coupled to a radio network gateway (GWY) 34. In the exemplary implementation in which the communication system operates pursuant to the operating specification that defines the GSM/GPRS cellular communication system, the gateway includes, for instance, the functionality of a GGSN (Gateway GPRS Service Node).

The gateway is coupled to a communications network, here a wide-area packet data network (PDN) 36, such as the Internet. And, a correspondent node (CN) 38 is coupled to the network 36. The correspondent node is representative of a communication entity, such as a data server, that serves as an ultimate data source, or destination, of data that is communicated with the mobile station.

During exemplary operation of the communication system, data communicated between the base transceiver station and the mobile station is communicated in bursts. That is, data bursts are communicated at selected intervals pursuant to effectuation of a communication service. The data bursts are each formed of one or more symbols. Here the data is formatted into data packets or frames having header portions and payload portions. And, the symbols selectably form data symbols and pilot symbols. As operation of an embodiment of the present invention need not make use of pilot symbols, the symbols contained in a data burst shall herein sometimes generically be referred to as data symbols or, more simply, symbols.

The data symbols are of values that include frequency components. And, here the data symbols are of values selected from a modulation constellation. For instance, the modulation constellation forms a QPSK (quarternary phase shift keying) modulation set or an 8-PSK (phase shift keying) modulation set. Each data symbol of the modulation set is defined, in part, in terms of a frequency, or radial, component. When communicated during operation of the communication system, the frequency component of the symbol must be correctly ascertained in order properly to determine the value of the symbol.

Because the communication system is a nonideal communication system, the values of the data symbols are susceptible to distortion during their communication. Of significance here is frequency offset that might be introduced upon the data symbols during their communication to a data destination. The frequency offset alters the frequency components of the data symbols. If the frequency offset is large enough, and compensation is not made for the frequency offset, the values of the data symbols are not able to be determined properly, i.e., accurately.

Frequency offset is introduced upon the data symbols, for instance, at the receive part that receives the data bursts. Here, the receive parts 22 and 26 of the base transceiver station and the mobile station, respectively, introduce frequency offset upon the data symbols of the data bursts received thereat. The offset is caused by imperfections of the electronic circuitry of the receive parts. And, the amount of the offset is dependent upon the amount of imperfection of the electronic circuitry of the receive parts.

Frequency offset is also introduced upon the data symbols as a result of Doppler shifting. Doppler shifting occurs when the mobile station moves during communication of data. The arrow 42 is representative of movement of the mobile station in two directions. And, movement of the mobile station in other directions, or combinations of directions, can analogously be shown. The amount of Doppler shifting, and the amount of frequency offset resulting therefrom, is dependent upon the velocity at which the mobile station moves, relative to the base transceiver station during communication of the data bursts.

Whatever the cause of the frequency offset, compensation must be made to correct for the offset in order for the values of the data symbols properly to be recovered. The receive parts 22 and 26 of the base transceiver station and the mobile station each include apparatus 46 of an embodiment of the present invention. The apparatus 46 functions to estimate the frequency offset introduced upon the data symbols of the data bursts received at the respective ones of the receive parts. Here, operation of the apparatus shall be described with respect to operation of the apparatus at the receive part 26 of the mobile station. Operation of the apparatus positioned at the base transceiver station can be analogously described.

The elements of which the apparatus 46 is shown to be formed are functionally represented and represent functional operation of the apparatus. Such elements are implemented in any desired manner. In the exemplary implementation, the functions performed by the respective elements are implemented, at least in part, by algorithms executable by processing circuitry.

The receive part of the mobile station is here shown to include a down-converter 48 that operates to down-convert, in frequency, the data bursts received thereat to a baseband level. The down-converter is representative of electronic circuitry of the receive part at which frequency offset might be introduced upon the data bursts. And, as noted above, additional frequency offset, caused by Doppler shifting, is already introduced upon the symbols of the data bursts during transmission of the data bursts upon the forward link to the mobile station.

Baseband-level representations of the received data bursts are provided, by way of the line 52, to a pre-multiplier element 54. The pre-multiplier operates to multiply the data symbols of a received data burst by a rotation term, to form thereby a rotated data burst. The rotation term by which the data symbols of the data burst are multiplied are selected from a set of allowable rotation terms. Here, the rotation terms are maintained at a storage element 56 at which each rotation term of the set is stored. The set includes, for instance, a number Q of phase rotation terms. And, the pre-multiplier operates to form Q separate, rotated data bursts. Each of the rotated data bursts is formed by selecting a separate one of the Q rotation terms by which to multiply the representation of the data burst provided to the pre-multiplier element.

The number of phase rotation terms of which the set is formed is determinative of the resolution of the frequency offset that is estimated during operation of an embodiment of the present invention. The greater the number of Q, assuming equal spacings of the values of the rotation terms, the better the resolution that is provided. And, the phase rotation terms are selectable, for instance, as a result of the range of frequency offsets that are possible during operation of the communication system. The range of frequency offset is, for instance, a parameter that is set forth in the operating specification that defines the parameters of operation of the communication system 10.

Rotated data bursts, forming vectors, are formed by the pre-multiplier on the lines 58 that extend to a first-stage estimator and determiner element 62. When Q separate rotated data bursts are formed by the pre-multiplier, the Q separate rotated data bursts are provided to the estimator and determiner element 62. The first-stage estimator and determiner operates to estimate the data sequence for each of the separate rotated data bursts formed by the pre-multiplier. That is to say, the estimation that is made estimates the actual values of the data symbols of the data burst based upon the values of the data symbols multiplied by an associated phase rotation term.

In the exemplary implementation, the estimation performed by the element 62 forms an estimated sequence d* for each of the rotated data bursts. That is, when Q separate rotated data bursts are provided to the element 62, Q separate estimated sequences d* are formed. While the estimated sequences are formable through the use of any desired estimation technique, in the exemplary implementation of an embodiment of the present invention, the sequences are formed by projecting the rotated data bursts are projected onto a subspace defined by a matrix H. The matrix H is a matrix representative of the channel impulse response (CIR) of, or representative of, the channel upon which the data bursts are communicated to the mobile station. Here, the values that form the matrix and that represent the channel impulse response are shown to be provided to the element 62 by way of the line 64. The channel impulse response is determined in any desired manner and is here considered to be known, or otherwise available for use, to perform the estimations by the element 62.

The matrix H upon which the rotated data bursts are projected is in Toeplitz form. Through such projection of the data bursts onto the matrix, the estimation of the sequences are efficiently formed.

Q separate estimated sequences are formed on the lines 64. The lines 64 extend to a noise and standard deviation calculator 66. The calculator operates to determine a noise sequence n* for each of the estimated data sequences formed by the estimator element 62. And, the standard deviation of each of the noise sequences is also calculated.

The lines 64 also extend to a comparator 68. And, lines 72 also extend to the comparator 68 from the noise and standard deviation calculator 66. And, the noise and standard deviation calculator further operates to provide values, to the comparator, of the standard deviations determined thereat for each of the noise sequences associated with the Q estimated data sequences.

The comparator operates to compare the values of the standard deviations provided thereto on the lines 72. The comparator selects the standard deviation of the smallest value and the frequency offset of the corresponding estimated data sequence to be the amount of frequency offset that has been introduced upon the symbols of the data burst that is provided to the apparatus 46 upon the line 52. Values representative of the frequency offset, so-selected, are formed on the line 76 and are provided to a summing element 78. The summing element is here also coupled to the line 52 upon which the baseband representations of the symbols of the data burst received at the mobile station are formed. The summing element operates to rotate each symbol provided on the line 52 by the value of the frequency offset provided on the line 76. Thereby, the summing element generates, on the line 82, frequency-corrected values of the symbols, frequency-corrected by the amount of frequency offset determined by the apparatus 46 to be frequency-offset introduced upon the symbols of the data burst prior to their delivery to the apparatus 46. Further processing of the symbols of the data burst are made by other structure (not shown in the Figure) of the receive part of the mobile station.

The procedure carried out by the apparatus 46 provides for the estimation of the offset frequency. The symbols of the representations of the data burst are pre-multiplied with a phase rotation term selected from a set of pre-chosen values for the offset. When there are Q pre-chosen values contained in the set, Q separate pre-multiplication operations are performed, thereby to form Q separate pre-multiplied representations of the symbols of the data bursts. Then, the sequence d* is calculated for each of the Q separate pre-multiplied representations of the symbols. The sequence is calculated by projecting the rotated, received vector onto the subspace spanned by the matrix H, wherein H is the channel impulse response, in Toeplitz form, of a channel representative of the channel upon which the data is communicated to the apparatus 46. Then, for each sequence, a noise vector n* and its standard deviation are computed. The frequency offset is selected in the chosen set corresponding to the associated noise vector that exhibits the smallest standard deviation.

The procedure takes advantage of a conjecture in which offset is considered to be present but neglected in the data detection process. All possible sequences of d with elements chosen from a modulation constellation shall yield a noise sequence n with greater energy than $n_s$ unless the phase rotation increment happens to be an integer multiple of the smallest modulation constellation increment.

Figure 2:
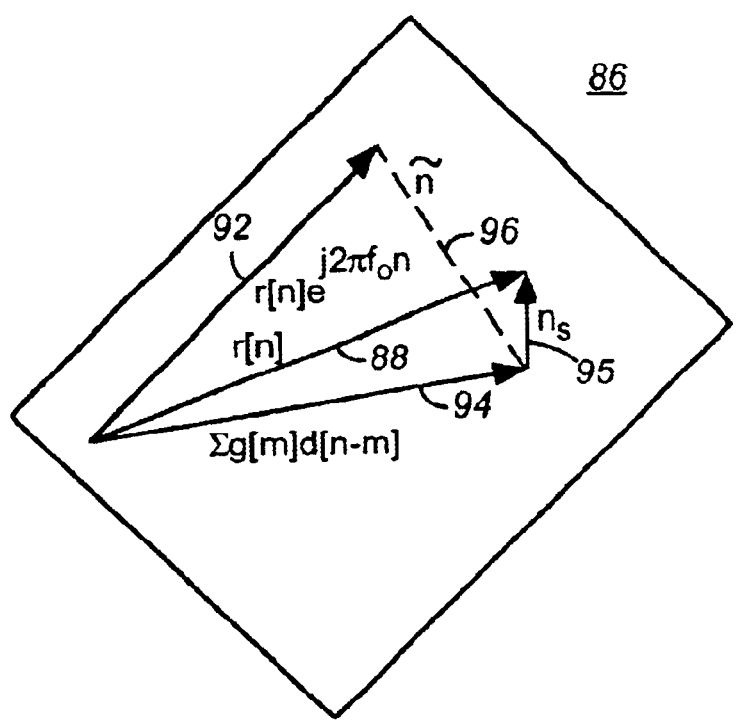
FIG. 2 illustrates a vector representation of operation of an embodiment of the present invention by which to estimate frequency offset introduced upon symbols of a data burst communicated during operation of the communication system shown in FIG. 1.

FIG. 2 illustrates a representation, shown generally at 86, that graphically explains the procedure by which an embodiment of the present invention is operable. The vector 88 represents a received signal r[n] without introduction of frequency offset. And, the vector 92 represents the same signal, but with the introduction of frequency offset, $f_o$. The in-plane vector 94 represents a phase reference. And, the vector 94 represents a noise sequence $n_s$ therebetween. The noise term, indicated by the vector 96, associated with the frequency-offset signal, is of greater length than the vector 94.

Figure 3:
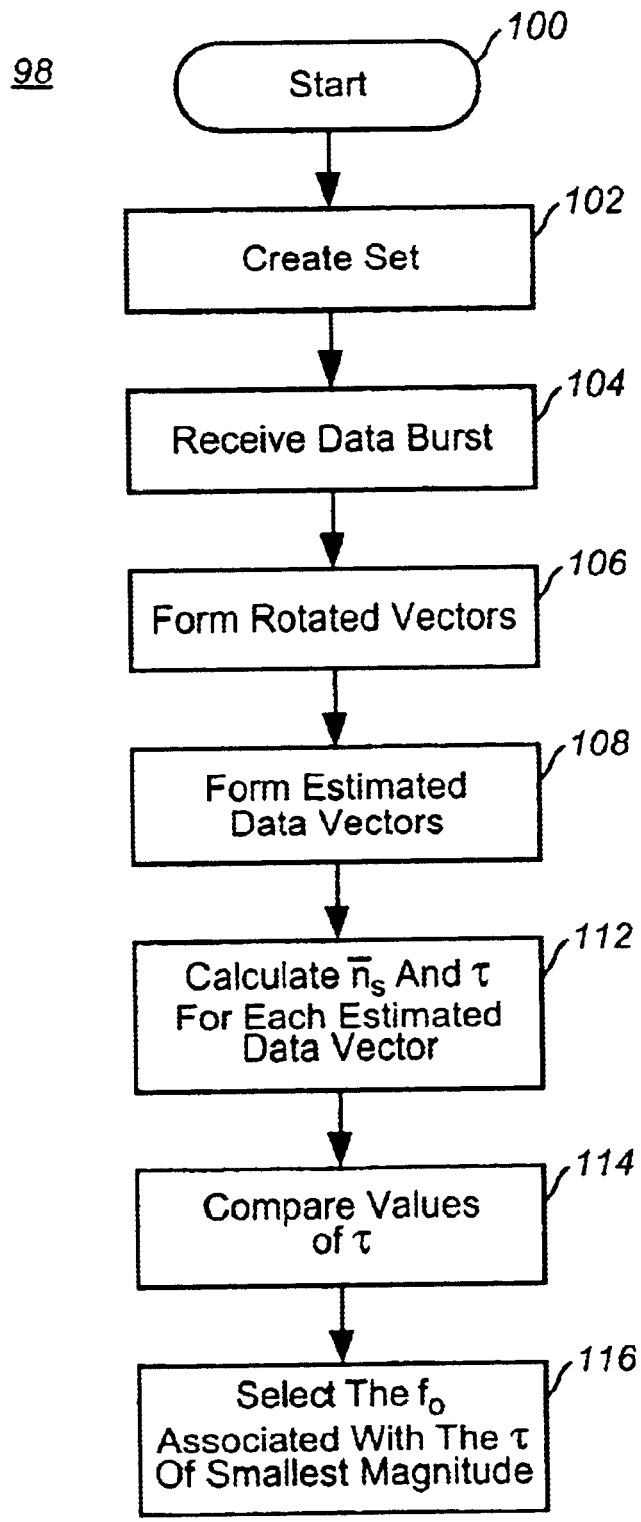
FIG. 3 illustrates a flow chart representative of operation of an embodiment of the present by which to estimate frequency offset introduced upon data communicated during operation of a communication system, such as the communication system shown in FIG. 1.

FIG. 3 illustrates a flow chart, shown generally at 98, representative of the procedure by which an embodiment of the present invention is operable. The procedure provides an estimate of the frequency offset that is introduced upon a sequence of one or more symbols during its communication by a sending station to a destination. Once the frequency offset has been estimated, frequency correction operations can be performed to compensate for the frequency offset that is estimated to have been introduced upon the data symbols of the sequence.

Entry into the procedure is indicated by the start block 100. Then, and as indicated by the block 102, a set of Q, in number, values of frequency offset is chosen. The set is chosen, for instance, to correspond with an expected range of frequency offsets that are considered to be most likely to be introduced upon the data sequence. And, the values are, for instance, equidistantly spaced between the bounds defining the range, thereby to define the resolution at which the frequency offset is estimable.

Operation of the procedure continues when a data sequence is received, indicated by the block 104. The data sequence forms, for instance, a data burst containing a sequence of symbols, defining a data vector. The symbols are defined, in part, by frequency components, and the symbols are susceptible to the introduction of frequency offset. The frequency offset is caused by any of various factors, such as Doppler shifting, circuitry imperfections, or other causes.

Then, and as indicated by the block 106, rotated vectors are formed. A separate rotated vector is formed for each element of the set of values of frequency offset. That is to say, if the set includes Q elements, Q separate rotated vectors are formed. The rotated vectors are formed by multiplying the symbols of the data sequence by the value of an element of the set thereby to shift in frequency each symbol of the data sequence.

Data sequence estimation is then performed, as indicated by the block 108. A separate data sequence is estimated for each of the rotated vectors. When Q rotated vectors are formed, Q data sequences are estimated. Estimation is performed, for instance, by projecting a rotated vector onto the subspace spanned by a matrix representative of the channel impulse response of the channel upon which the data sequence is communicated to the data destination.

Then, and as indicated by the block 112, a noise sequence is calculated for each of the estimated data sequences. And, the standard deviation (sigma) associated with each of the calculated noise sequences is determined. Then, and as indicated by the block 114, the values of the standard deviations for each of the calculated noise sequences are compared. The comparison is made to determine which standard deviation is of the smallest magnitude.

And, as indicated by the block 116, selection is then made of the frequency offset that is associated with the estimated data sequence that exhibits the smallest standard deviation. That is to say, the value of the element that is used to rotate symbols of the received data sequence to form the rotated vector from which the estimated data sequence is formed is selected as the frequency offset that has been introduced upon the symbols of the data sequence. Frequency correction operations, if desired, can then be implemented to correct for the selected, estimated frequency offset.

Figure 4:
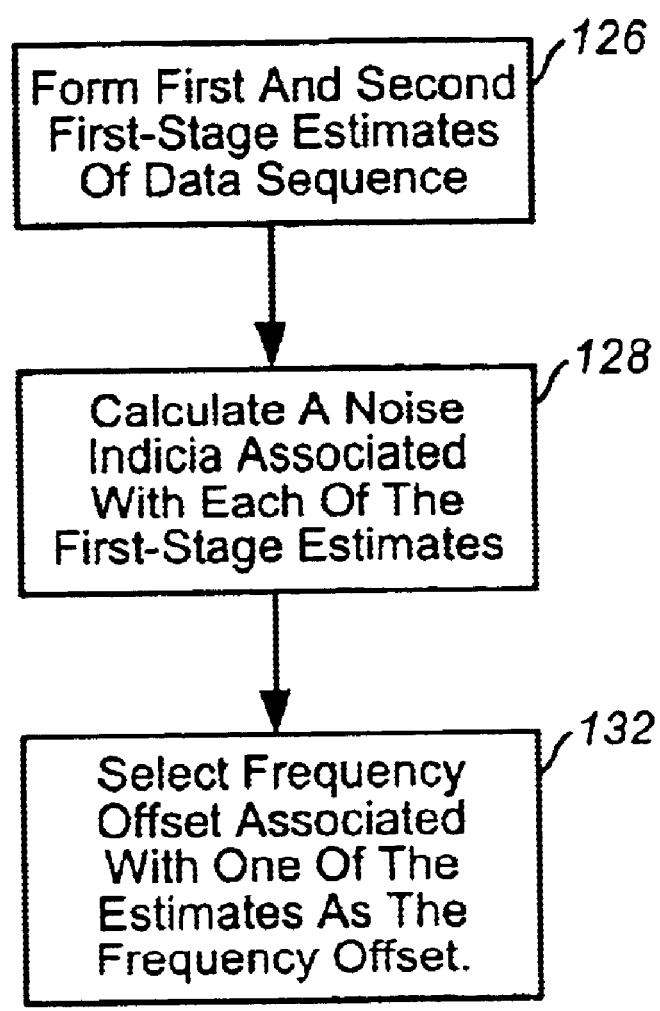
FIG. 4 illustrates a method flow diagram representative of operation of an embodiment of the present invention.

FIG. 4 illustrates a method flow diagram, shown generally at 124, representative of the method of operation of an embodiment of the present invention. The method estimates a frequency offset of received data symbols of a data sequence. The data sequence, formed of initial data symbol values, is communicated upon a communication channel to a receiving station.

First, and as indicated by the block 126, a first, first-stage estimate of the data sequence and at least a second, first-stage estimate of the data sequence are formed.

Then, and as indicated by the block 128, a noise indicia associated with each first-stage estimate is calculated. And, as indicated by the block 132, a selected one of the first and at least second, first-stage estimates is selected to be associated with the frequency offset of the data symbols of the data sequence.

Thereby, a manner is provided by which to perform frequency offset estimation. The estimation is performed accurately and is the accuracy of the estimation is not dependent upon the magnitude of the actual offset. Only linear techniques are used in the estimation, limiting the computational complexity required of the estimations.

The previous descriptions are of preferred examples for implementing the invention, and the scope of the invention should not necessarily be limited by this description. The scope of the present invention is defined by the following claims:

I claim:

1. Apparatus for estimating in a communication system in which a data sequence, formed of initial data symbol values, is communicated upon a communication channel to a receiving station, said apparatus for estimating, responsive to received data symbol values, received at the receiving station, frequency offset of the received data symbols, said apparatus comprising:

a multiplier coupled to receive values of the received symbols, said multiplier for multiplying the values of the received symbols by at least a first rotation term to form a first product value sequence and for multiplying the values of the received symbols by at least a second rotation term to form at least a second product value sequence;

a first-stage data value determiner coupled to receive indications of the first and at least second product value sequences, respectively, formed by said multiplier, said first-stage data-value determiner for determining a first, first-stage estimate of the data sequence and at least a second, first-stage estimate of the data sequence;

a noise indicia calculator coupled to said first-stage data-value determiner, said noise indicia calculator for calculating a noise indicia associated with each first-stage estimate formed by said data-value determiner; and a selector coupled to receive values of the noise indicia calculated by said noise indicia calculator, said selector for selecting a selected one of first and at least second, first-stage estimates, respectively, to be the frequency offset of the receiving data symbols.

2. The apparatus of claim 1, wherein the first and at least second rotation terms, respectively, used by said multiplier are selected from a product value sequence set.

3. The apparatus of claim 2 wherein the initial symbol values of which the data sequence is formed are selected from a constellation set of allwable symbol values, and wherein the first and at least second rotation terms are each within a range of values.

4. The apparatus of claim 3 wherein the first and at least second rotation terms are offset, relative to one another, by equidistant offsets, the equidistant offsets defining a resolution by which the frequency offset is determinable.

5. The apparatus of claim 1 wherein said first-stage data-value determiner is further coupled to receive indicia associated with the communication channel upon which the data sequence is communicated to the receiving station and wherein the first and at least second first-stage estimates, respectively, of the data sequence are of values responsive, in part, to the indicia associated with the communication channel.

6. The apparatus of claim 5 wherein the indicia associated with the communication channel and to which said first-stage data-value is coupled to receive comprises a channel impulse response.

7. The apparatus of claim 6 wherein each of the first and at least second first-stage estimates of the data sequence are formed by rotating, respectively, the first and at least second product value sequences onto a matrix representative of the channel impulse response.

8. The apparatus of claim 7 wherein the matrix representative of the channel impulse response is in Toeplitz form.

9. The apparatus of claim 1 wherein said noise indicia calculator calculates a noise vector associated with each first-stage estimate formed by said data value determiner.

10. The apparatus of claim 9 wherein said noise indicia calculator further calculates a standard deviation associated with each noise vector.

11. The apparatus of claim 10 wherein said selector selects the selected one of the first and at least second, first-stage estimates, respectively, having a smallest standard-deviation to be the frequency offset.

12. A method for estimating in a communication system in which a data sequence, formed of initial symbol values, is communicated upon a communication channel to a receiving station, said method for estimating, responsive to received symbol values received at the receiving station, a frequency offset of the received symbols of the data sequence, said method comprising:

multiplying values of received data symbols by a first rotation term to form a first product value sequence and by at least a second rotation term to form at least a second product value sequence, the first and second rotation terms selected from a product value sequence set;

determining a first, first-stage estimate of the data sequence and at least a second, first-stage estimate of the data sequence;

calculating a noise indicia associated with each first-stage estimate formed during said operation of determining; and selecting a selected one of the first and at least second first-stage estimates, respectively, to be the frequency offset of the data symbols of the data sequence.

13. The method of claim 12 wherein the first and at least second first-stage estimates of the data sequence determined during said operation of determining are determined responsive to indications of the data symbol values received at the receiving station and responsive to indicia associated with the communication channel upon which the data sequence is communicated to the receiving station.

14. The method of claim 13 wherein said operation of determining comprises projecting a representation of the first and at least second first-stage estimates onto a subspace spanned by a matrix, in Toeplitz form, representative of the channel impulse response.

15. The method of claim 14 wherein the noise indicia calculated during said operation of calculating comprises a noise vector and an associated standard deviation.

16. The method of claim 15 wherein the selected one selected during said operation of selecting to be the frequency offset of the data sequence that has associated therewith a standard deviation of smallest value.

* * * * *